United States Patent [19]

Day

[11] 4,156,502

[45] May 29, 1979

[54] ENVIRONMENTAL CONDITION CONTROL SYSTEM

[75] Inventor: James L. Day, Fairport, N.Y.

[73] Assignee: James L. Day Co., Inc., Rochester, N.Y.

[21] Appl. No.: 850,566

[22] Filed: Nov. 11, 1977

[51] Int. Cl.² .................... F23N 5/20; G05D 23/00
[52] U.S. Cl. ................................ 236/46 R; 165/12; 236/91 R; 337/301
[58] Field of Search ............... 165/12, 16; 236/46 R, 236/91 R, 49; 337/301

[56] References Cited

U.S. PATENT DOCUMENTS

| 2,528,766 | 11/1950 | Marcellus | 337/301 X |
| 2,832,870 | 4/1958 | Kucera | 236/46 X |

Primary Examiner—William E. Wayner
Attorney, Agent, or Firm—Martin Lu Kacher

[57] ABSTRACT

The efficiency of an environmental control system such as a heating, ventilating and air conditioning system is enhanced and energy is conserved by starting and stopping the heating or air conditioning modes of operation at variable times at the beginning and end of an occupancy period, which times are a function of an environmental condition, such as outside temperature in the case of heating and inside temperature in the case of air conditioning. To this end a control system is provided which generates an output for initiating and terminating the operation of the conditioner. Separate intervals during which the generation of the variable output for initiating the operation of the conditioner and for terminating the operation thereof are established as by means of an arrangement of cams driven by a timer motor which runs during these intervals. The variable output may be provided by a switch mounted on an arm of a pneumatic-mechanical feedback system which changes the position of the arm and the instant of time when the cam can actuate the switch as a function of an environmental condition such as the inside temperature or the outside temperature, a pneumatic signal proportional to which is applied to the feedback system.

11 Claims, 4 Drawing Figures

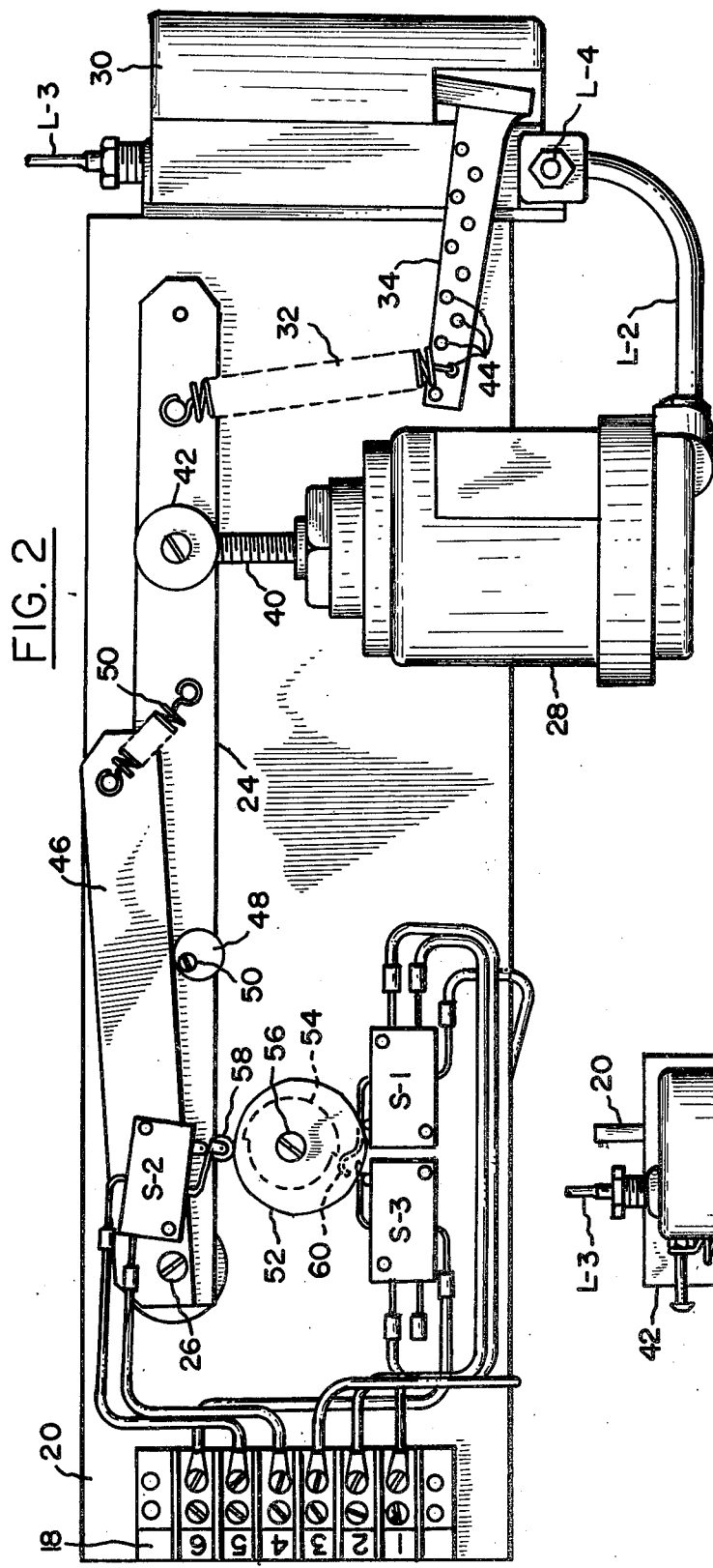
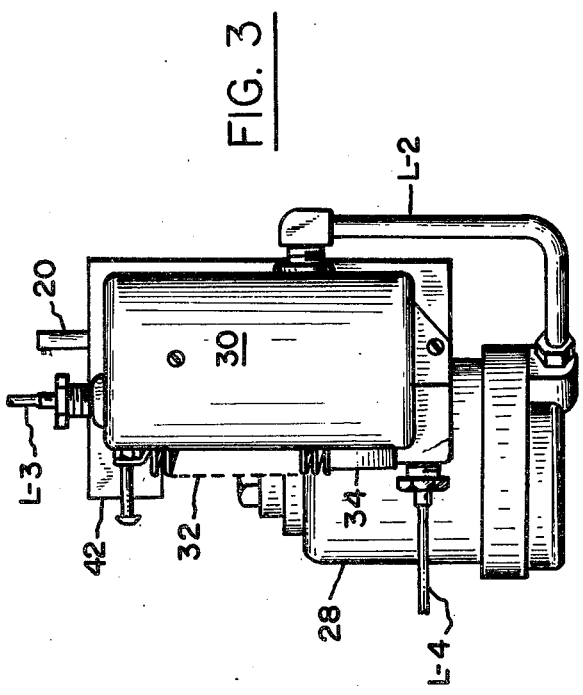
FIG. 2
FIG. 3

ENVIRONMENTAL CONDITION CONTROL SYSTEM

The present invention relates to a control system for an environmental conditioner and particularly to a system for enhancing the efficiency of an environmental conditioner by initiating and terminating the operation thereof at optimal times depending upon an existing environmental condition.

The present invention is especially suitable for use in heating, ventilating and air conditioning systems and serves to initiate and terminate the operation of the heating system or the air conditioning system at variable times depending upon the inside or outside temperature. The system also turns the ventilating apparatus on and off at predetermined times and maintains the temperature at a preset temperature after the heating or air conditioning system operation is initiated and until the operation of this system is terminated. The invention is however applicable for the control of environmental conditions generally and the application of the invention in a control system which starts the heating system earlier as the outside air temperature decreases or starts a cooling system earlier as the temperature inside a building increases is typical. The time when the operation of the heating or air conditioning system is initiated is variable and is referred to herein as the "variable start". The time when the ventilating system (which of course includes ventilation and exhaust) typically operates only during occupied periods and not during warm-up or cool-down periods and it is referred to herein as the "late start".

Control systems are available which are capable of providing optimal start timing of heating, ventilating and air conditioning systems. Such control systems do not however have the facility of optimally controlling the time when the operation of the heating, ventilating and air conditioning system is terminated or stopped. By terminating the operation of the heating and air conditioning system at variable times at the end of an occupancy period, considerable savings in energy can be obtained. For example a typical application would be to stop all ventilation near the end of an occupied period, say in a school at 3:00 p.m.. If the outside temperature was high the heating system would then be terminated immediately (viz, the heating system would operate in the unoccupied mode). If the outside temperature decreased the heating system would be controlled to stay on in the occupied mode with no ventilation so as to provide environmental conditions which would be comfortable for the teachers or other employees who remain after the students left the school.

The complexity of control systems for providing optimal start control functions also renders them unsuitable for many applications and unreliable in operation. Such systems are oftentimes not adapted for use with existing installations (viz, existing heating, ventilating and air conditioning systems) and extensive adaptation and modification of the systems such as additional instrumentation must be provided. The cost of such additions and modifications may render the installation of the control system uneconomic and such installations are not made. It is a feature of this invention to provide an improved control system which provides optimal timing both the initation and termination or wind-down of a heating, ventilating and air conditioning system or other environmental conditioner which may be installed for controlling existing systems without the need for extensive additional equipment or modifications. The invention thus renders economic the saving of energy and serves the public's interest.

For further information respecting the design of control systems which have heretofore been proposed, reference may be had to U.S. Pat. No. 3,979,059 issued Sept. 7, 1976 which shows an electronic analog computer arrangement for delaying the start of a preheat period depending upon outside temperature. Facilities for optimum termination of heating system operations and simplicity of installation, adaptability to existing installation, and reliability afforded by the present invention would not be obtained by such an electronic analog computer apparatus. U.S. Pat. No. 2,569,530 issued Oct. 2, 1951 shows a control system which provides a fixed rather than variable time for the starting of a preheat period and enables the duration of the preheat period to be controlled. Neither variable start nor wind-down nor the simplicity and ease of installation afforded by the present invention would be obtained. Control systems which change the temperature set point at which a heating system is controlled to operate are described in U.S. Pat. Nos. 2,778,571 issued Jan. 22, 1957; 2,719,672 issued Oct. 4, 1955; and 3,076,606 issued Feb. 5, 1963. U.S. Pat. Nos. 2,344,991 issued Mar. 28, 1944 and 2,557,661 issued June 19, 1951 describe proportional controllers. None of these patents have facilities for variable times of starting and stopping of a heating system and would not obtain the efficiencies afforded by the use of a control system embodying the invention.

Accordingly, it is an object of the present invention to provide an improved control system for an environmental conditioner which may be applied for the control of heating, ventilating and air conditioning systems.

It is a further object of the invention to provide a control system which affords variable initiating and terminating of the operation of an environmental conditioner, such as a heating, ventilating and air conditioning system, depending upon existing environmental conditions.

It is a still further object of the present invention to provide an improved control system for an environmental conditioner which is capable of controlling a plurality of environmental conditions, such as heating, and air conditioning and also ventilation with heating and air conditioning variably controlled while ventilation is controlled to start and stop at predetermined times a day.

It is a still further object of the present invention to provide an improved control system for environmental conditioners, such as heating, ventilating and air conditioning systems, which is adapted to be installed in existing systems without extensive modifications or the need for additional equipment.

It is a still further object of the present invention to provide an improved control system for an environmental conditioner such as a heating, ventilating and air conditioning system which is simple in design and reliable in operation.

Briefly described, a control system for an environmental conditioner embodying the invention utilizes means for selectively initiating and terminating the operation of the conditioner. Such means may be adapted to provide an output during the period when the environmental conditioner is to be rendered operative. More particularly, such means may include a switch for supplying operating power to the conditioner. Means are also provided for operating the initiating and terminating means for enabling initiating and terminating modes of operation thereof during different intervals of time of day. Such means may be provided by an arrangement of cams driven by a timer motor which provides different displacement or separation between the switch actuating surface of the cam and the switch. For example, the switch will be closer to the actuating surface during the initiating interval and further away during the terminating interval. Means are also provided which are responsive to an environmental condition, say inside or outside temperature, for varying the time during the initiating and terminating intervals when the initiating and terminating means is operated. The variable start time and the variable stop time (viz, the duration of the variable output) thus depends upon the environmental condition. A pneumatic mechanical feedback or servo system having an arm which carrys the switch may be used for this purpose. The position of the arm depends upon the environmental condition input to the pneumatic mechanical feedback system and provides another degree of control over the displacement or separation between the switch and the cam actuating surface. Between the initiating and terminating intervals, the cams stop or dwell and the switch opens and closes as a function of the environmental condition (e.g., inside or outside temperature) and maintains preset the controlled condition. Thus, for example, the temperature in the building during the time that it is occupied is maintained at a preset temperature.

The foregoing and other objects and advantages of the invention as well as presently preferred embodiments thereof will become more apparent from a reading of the following description in connection with the accompanying drawings in which:

FIG. 2 is a plan view of the optimal timer of the control system shown in FIG. 1, which provides optimal starting and wind-down or shut down of the heating, ventilating and air conditioning system with which it is used;

FIG. 3 is an end view of the optimal timer shown in FIG. 2; and

Figure 1:
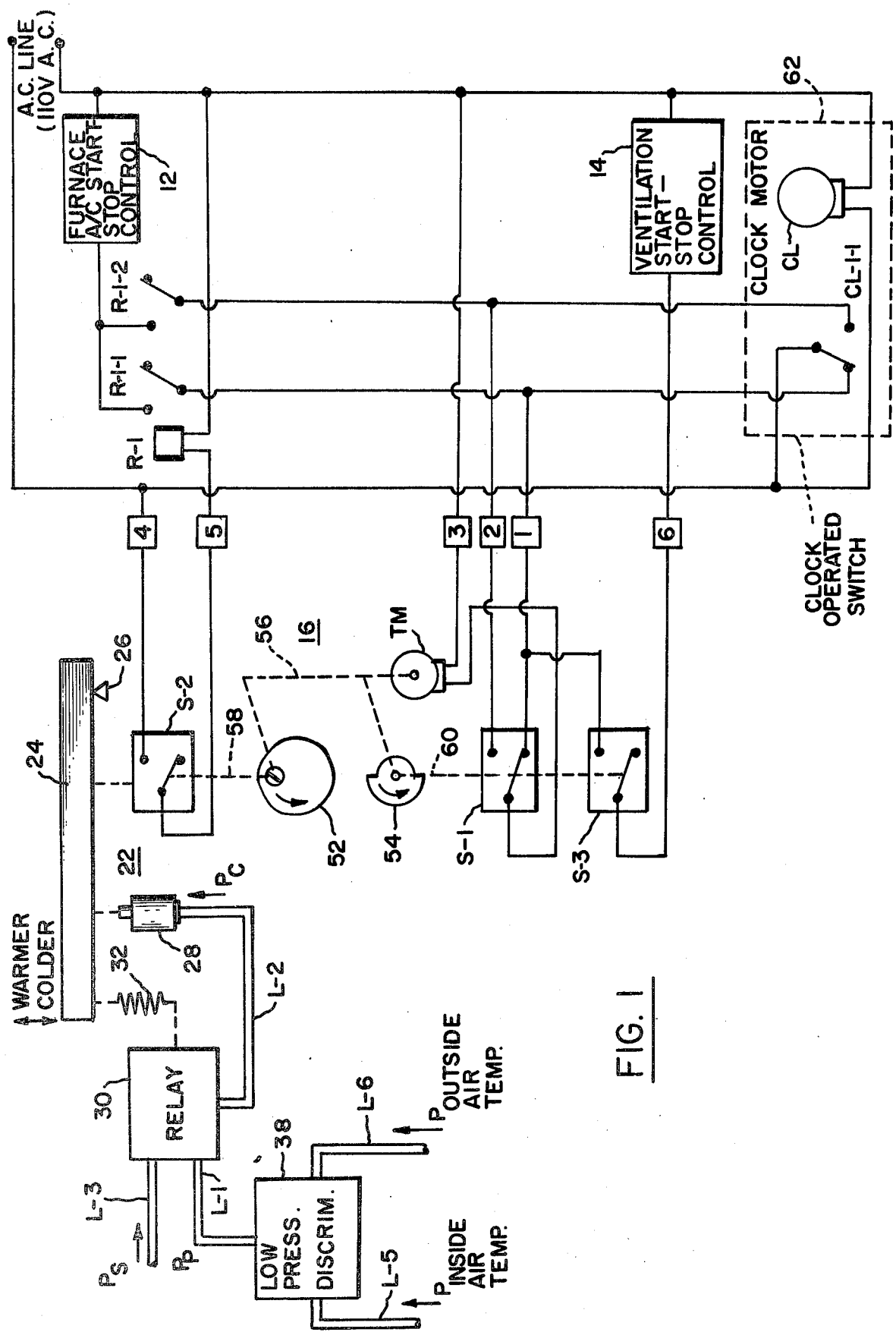
FIG. 1 is a schematic diagram showing a control system in accordance with the invention.

Referring more particularly to the drawings there is shown a control system 10 which is applied for operating an environmental conditioner in the form of a heating, ventilating and air conditioning system. This system includes a furnace or air conditioner having a start/stop control 12 which may be part of the furnace or air conditioner and operates to turn the furnace or air conditioner on when power is supplied to the control 12. A ventilation stop/start control 14 which may be also part of the environmental conditioner, starts and turns on the ventilating and/or exhaust fans when alternating current is applied thereto. The fans stop when the current stops.

Current for operating the controls 12 and 14 and the electrical portion of the control system 10 is obtained from the alternating current power lines (e.g. 110 Volts A.C.) (see FIG. 1). The control system 10 contains an optimal timer 16 having output terminals labeled with numerals (1) through (6) and correspond to the terminals on a terminal strip 18 (FIG. 2). This terminal strip 18 is attached to a panel 20 on which the component parts of the optimal timer 16 are mounted. Some of these parts are contained in a pneumatic-mechanical feedback or servo system 22; namely, an arm 24 which is pivotally mounted at an axle 26 to the panel 20, a pneumatic piston operator 28, a feedback relay 30, which is mounted to the side of the panel 20 (see FIGS. 2 and 3), and a feedback spring 32 which connect the arm 24 to the relay 30 by way of a spring arm 34.

A pneumatic line L-2 carries a control pressure $P_C$ which is applied to the piston operator 28 for pivoting the arm upwardly or allowing the arm to move under the bias of the spring 32 downwardly. Such movements are a function of the inside and outside air temperatures. Pneumatic signals from temperature sensors having pneumatic outputs, corresponding to the inside air temperature are applied by way of a line L-5 to a low pressure discriminator 38. A pneumatic line L-6 applies a pneumatic pressure corresponding to the outside air temperature to the discriminator 38. The discriminator 38 selects one of these pressures, whichever is lowest and applies that pressure as a pilot pressure $P_P$ on a line L-1 which is connected to the relay 30. The relay also receives a constant instrument air supply pressure $P_S$ (e.g. 20 psi) on another line L-3 which is connected thereto. When the inside air temperature is higher the pressure corresponding thereto is lower and that pressure is applied as the pilot pressure $P_P$ to relay 30. Conversely, if the outside air temperature is higher, $P_P$ corresponds to the outside air temperature. The piston operator 28, the relay 30, and the discriminator 38 are pneumatic instrumentation components which are commercially available.

As shown in FIGS. 2 and 3 the output shaft 40 of the piston operator 28 bears against a disc 42 which is secured to the arm 24 and provides a greater bearing surface than the edge of the arm. The feedback spring 32 is adjustably positionable in holes 44 in the spring arm 34. By changing the location of the spring 32 along the arm, the feedback force applied in a downward direction to the arm 24 through the spring 32 may be adjusted so as to cover the range of pressures from the pneumatic temperature sensors which may already be installed in an existing building. For larger and gross changes in pressure the spring 32 itself may be replaced with a spring of different spring rate. The set point at which the arm 24 is positioned for a given desired temperature is adjusted within the relay by means of a set screw contained under the outer cover thereof. The pilot pressure $P_P$ in the relay varies the constant pressure $P_S$ thereby varying the force tending to pivot the spring arm 34. Accordingly, if the pilot pressure $P_P$ corresponds to warmer temperatures the arm moves up, while for colder temperatures the arm moves down.

The optimal timer 16 also includes a switch S-2 which is a micro-switch of the single pole type which is carried on the arm 24. It is this switch S-2 which provides means for initiating and terminating the operation of the furnace or air conditioner. The switch S-2 is carried on an overtravel arm 46 (see FIG. 2). This overtravel arm moves with the main arm 24 and is held against a stop 48 by a spring 50. The stop 48 is a disc which is eccentrically mounted on the main arm 24 and may be rotated and fastened by a set screw 50 at a desired position in order to adjust the position of the switch S-2.

The optimal timer uses two cams 52 and 54 which are mounted side-by-side on the same shaft 56 and rotated therewith. The outer cam is shown as a linear rise cam and it is generally circular but eccentrically mounted on the shaft 56. The inside cam 54 has two circular surfaces each of which extends around 180 degrees of the cam surface. One surface is of a larger radius than the other. The cams 54 and 56 are shown in FIGS. 1 and 2 in the position which they assume at the beginning of the interval during which the mode of operation where the heating or air conditioning system may be initiated (usually the daytime mode) occurs. In other words the cams are in the position shown in the drawing before they start to rotate which occurs at the end of a period where the building is unoccupied (viz, usually the night time).

The shaft 56 is driven by a timer motor TM. The timer motor TM is mounted on the rear of the panel 20 and may be a clock motor which provides a 360° rotation during a given period of time. For purposes of illustration of the invention, the timer motor is considered to be a 6-hour timer such that the cams rotate 360° when the timer motor is energized for six hours. While the outer cam 52 is shown as a linear rise cam, other rises, say non-linear, may be used. A cam follower 58 follows the actuating surface of the cam 52. It will be seen therefore that the displacement between the switch S-2 and the cam 52 varies both as a function of the amount of rotation of the cam 52 and the rotation or pivotal motion of the arm 24. Since the pivotal motion of the arm 24 is a function of the temperature which is being monitored and the angular position of the cam 52 is a function of the time interval during which the cam rotates, the time when the switch S-2 is actuated and deactuated is therefore a function both of time of day and an existing environmental condition (e.g., temperature). Accordingly, the switch S-2 provides a variable start/stop output. The duration of that output corresponds to the time that the connection between terminals (4) and (5) is made through the switch S-2.

Two other switches S-1 and S-3 are mounted on the panel 20. A cam follower 60 conjointly actuates the switches S-1 and S-3. When the optimal timer 16 is stopped (viz, during the unoccupied period) the follower 60 actuates the switches S-1 and S-3 to the position shown in FIG. 1. The timer motor rotates the cams in a counterclockwise direction such that the switches S-1 and S-3 remain actuated in the position shown in FIG. 1 until the cam 54 rotates 180° (three hours in this example using a six-hour timer TM). Then the follower 60 permits the switches S-1 and S-2 to switch (viz, their movable switch arm makes contact with the upper contact of the set of six contacts thereof, as shown in FIG. 1.

Cooperating with the optimal timer 16 is a clock operated switch 62 having a clock motor CL and clock contacts CL-1-1. The contacts CL-1-1 are shown at the starting position of the system which occurs say at 6:00 A.M. in the morning in the usual application where a building which is occupied only during the day has its heating, ventilating, and air conditioning system controlled by the system 10. After a predetermined time, say nine hours (at 3:00 P.M.), the clock motor CL causes the switch CL-1-1 to switch contacts and initiate the wind-down or variable shut down (terminating) mode of operation of the control system 10.

The variable start/stop output is applied to a relay R-1 which causes relay contacts R-1-1 and R-1-2 to pull in. When the relay R-1 is pulled in, alternating current is applied to the furnace and air conditioner stop/start control 12 and the furnace or air conditioner is rendered operative. The switch S-3 is connected via output terminal 6 to the ventilation start/stop control 14 and will apply operating current thereto for late start which occurs three hours after the start of operation of the day mode of the control system 10, or at 9:00 o'clock in this illustrative example.

Consider the operation of the control system during a typical day. The system starts the day mode, at daybreak, for example 6:00 a.m. in the morning. The clock operated switch contact CL-1-1 makes at the position shown in FIG. 1. Since switch S-1 is on the rise of the inner cam 54, power is applied through CL-1-1 and S-1, which is in the position shown in FIG. 1 to the timer motor TM and the timer motor starts to turn. The cam shaft 56 turns as do the cams 52 and 54 in the clockwise direction as shown in FIG. 1. After a variable time depending upon the temperature which controls the position of the arm 24, switch S-2 is operated and completes the connection between terminals 4 and 5 thus applying power to relay R-1. That relay pulls in closing contacts R-1-1 and R-1-2. The overtravel arm 46 (FIG. 2) accommodates any extensive pivotal movement of the arm 24 in the downward direction. The timer motor TM continues rotating for three hours, since S-1 remains on the rise of the cam 54. After three hours S-1 drops off the rise of cam 54 as does S-3 and current flows through contact S-3 and the clock operated switch contact CL-1-1 to the ventilation start/stop control 14. Accordingly, at approximately 9:00 a.m. in this example, late start occurs and the ventilation system is turned on. Also since S-1 drops off the rise of cam 54 power to the timer motor TM is cut off and the cams stop.

The pneumatic-mechanical feedback system 22 continues to pivot upwardly or downwardly depending upon the pressure due to the inside or outside air temperature which is applied to the discriminator 38 (FIG. 1). The switch S-2 continues to move with the arm and although the variable cam 52 is fixed, the switch S-2 may open and close, thus starting or stopping the furnace or air conditioner through the relay R-1 and the furnace or air conditioner stop/start control 12. The temperature within the building is thereby controlled at the desired set point.

After nine hours the clock motor CL causes the clock switch CL-1-1 to change contacts, from the contact shown in FIG. 1 to the other fixed contact of that switch. Power is then applied through CL-1-1 and S-1, which is now in the up position, to the timer motor TM. The late start is automatically turned off since the circuit through the late start switch S-3 is broken at CL-1-1. The ventilation is then turned off. After a variable time depending upon the inside or outside air temperature and the angular position of the variable cam 52, the switch S-2 opens, thus providing variable shut-down for the furnace or air conditioner. The cam motor TM runs three more hours until S-1 returns to the position on the rise of the inner cam 54 as shown in FIG. 1. The motor TM then stops and the system shifts to night mode where it waits until 6:00 a.m. the next morning. In other words, at 12:00 p.m. the night mode of the system starts and does not end until 6:00 a.m. when the clock switch makes contact at the contact on the left as shown in FIG. 1. The optimal start timer provides both variable start and variable shut-down with the same equipment and without the need for complex electronics or electro-magnetic or pneumatic instrumentation.

Figure 4:
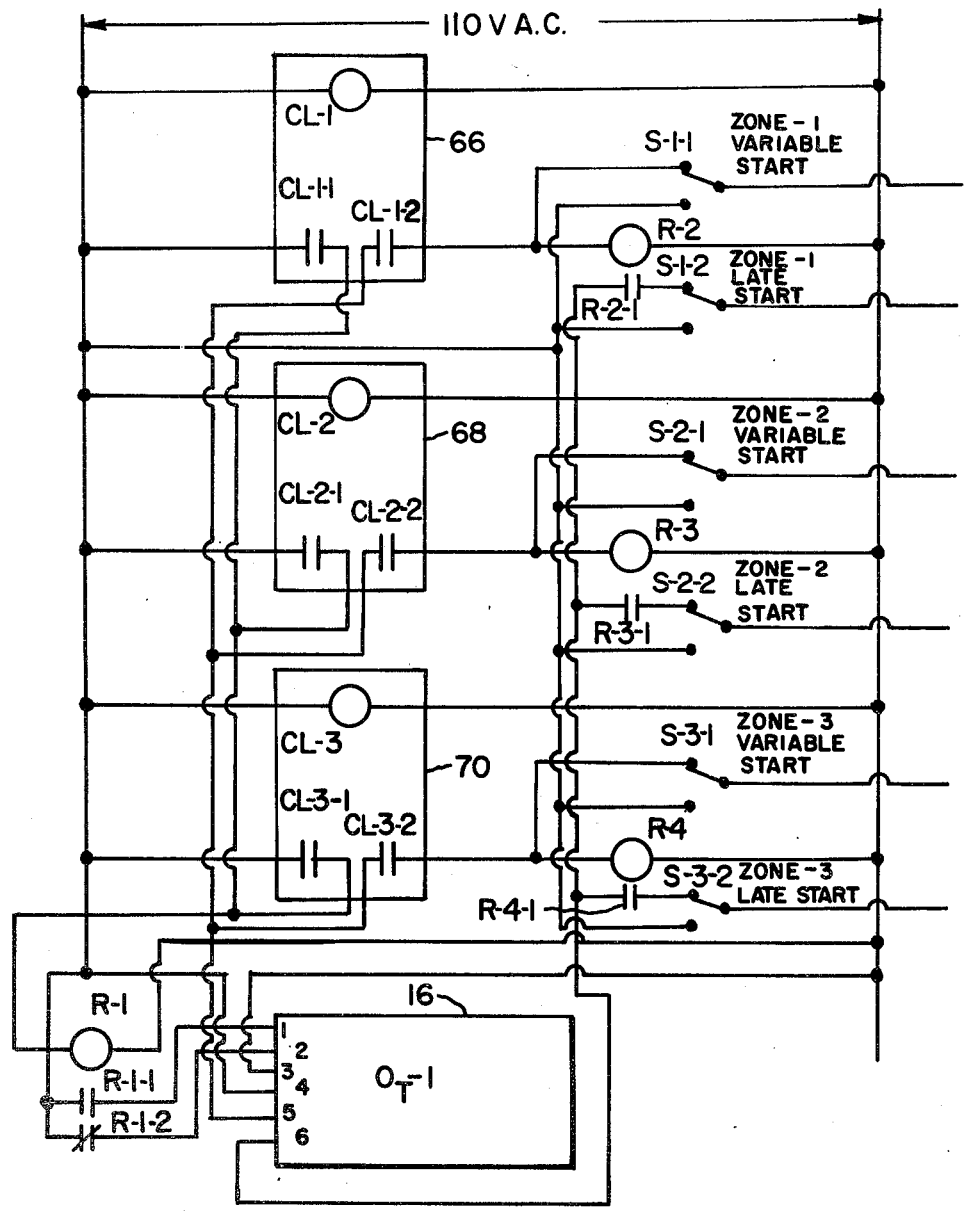
FIG. 4 is a schematic diagram of a multiple optimal start time control system which affords selective control over different zones as in a building, which system is provided also in accordance with the invention.

Referring now to FIG. 4, there is shown a multiple optimal start timer system which provides variable start and a fixed time late start of the heating, ventilating and air conditioning apparatus in a plurality of different zones, say different floors or parts of a building. The system uses an optimal timer $O_T$-1 which is similar to the optimal timer 16 which was described in connection with FIGS. 1, 2 and 3. The terminals of the optimal timer $O_T$-1 are marked with the numerals (1) through (6) which correspond to the output terminals (1) through (6) of the optimal timer 16 as shown in FIG. 1. Separate clock operated switching means 66, 68 and 70 are provided for each of the zones. A clock motor CL-1, Cl-2 and Cl-3 and a pair of normally open contacts CL-1-1 CL-1-2, CL-2-1 CL-2-2, CL-3-1 CL-3-2, are provided for each of these clock operated means 66, 68 and 70. At the start time the clock operated switch contacts of the clock switch means 66, 68 and 70 close. One or more of these contacts may be closed depending upon the program for starting the heating, ventilating and air conditioning system in each zone. Closure of any of these contacts (viz, CL-1-1, CL-2-1 or CL-3-1) applies operating power to a relay R-1. The normally closed contact R-1-2 of relay R-1 opens and the normally open contact R-1-1 closes. R-1-1 applies power to terminal (1) of the optimal timer $O_T$-1 and the timer motor TM starts running. When the variable start switch S-2 closes (viz, at the variable start time depending upon the air temperature) power is fed through contact S-1 from terminal 4 to terminal 5. Depending upon which switch 66, 68 and 70 is closed, power is applied through closed contact CL-1-2, CL-2-2 or CL-3-2 to relays R-2, R-3 or R-4. Switches S-1-1 and S-1-2 are provided in zone 1 for selecting variable start and late start operations. In other words the heating, ventilating and air conditioning system may or may not use the optimal timer control as desired. Similar switches S-2-1, S-2-2 and S-3-1, S-3-2; are provided with relays R-2, R-3 and R-4. The late start switch S-3 is connected to terminal 6 and provides operating power to the ventilating stop/start controls for the zone through the contacts R-2-1, R-3-1 and R-4-1 of the relays R-2, R-3 and R-4 for the zones. Accordingly, depending upon which clock operated switch 66, 68 or 70 is programmed to close. If variable start and late start (automatic operation) are selected by actuating the switches S-1-1 through S-3-2, then the optimal timer will provide variable start and late start for the heating, ventilation and air conditioning apparatus of the zone for that clock operated switch 66, 68 or 70.

When the zone clock CL-1, CL-2 or CL-3 opens as occurs when their zones are programmed to be in the unoccupied mode, the zone clock contacts CL-1-1, CL-2-2 or CL-3-2 interrupt power to the relay R-1 and cause the contact R-1-1 to return to the normally closed position. This allows the optimal start timer motor TM to index the cams 52 and 54 to the unoccupied dwell position. Of course the manual switches S-1-1, S-1-2; S-2-1, S-2-2; S-3-1, S-3-2 provide for manual override of the zone clock program.

From the foregoing description it will be apparent that there has been provided improved control systems for environmental conditioners. Although the system has been described in connection with the control of heating, ventilating and air conditioning systems it will be appreciated that features of the invention are applicable generally to environmental control and other applications as well as modifications and variations in the hereindescribed system will suggest themselves to those skilled in the art. Accordingly, the foregoing description should be taken merely as illustrative and not in any limiting sense.

What is claimed is:

1. A control system for an environmental conditioner which comprises means for selectively initiating and terminating the operation of said conditioner, means for operating said initiating and terminating means for enabling initiating and terminating modes of operation thereof during different intervals of time of day, means responsive to an environmental condition for varying the time during said initiating and terminating mode intervals when said initiating and terminating means is respectively operated to initiate and terminate the operation of said conditioner and comprising a pneumatic-mechanical control system for translating said environmental condition into a displacement of a mechanical number, said initiating and terminating means being mounted on said member, said displacement separating said initiating and terminating means and said operating means from being in operating relationship with each other, and said operating means comprising means for varying said displacement as a function of time to enable said initiating and terminating mode intervals.

2. The invention as set forth in claim 1 wherein said conditioner has first and second environmental conditioning modes of operation, said control system having in addition to said first mentioned initiating and terminating means second initiating and terminating means, said first initiating and terminating means being coupled to said conditioner for initiating and terminating the operation of said first environmental conditioning mode and said second initiating and terminating means being coupled to said conditioner for initiating and terminating said second environmental conditioning mode, and means for operating said second initiating and terminating means to initiate said second conditioning mode at a first predetermined time during said initiating mode interval and to terminate said second conditioning mode at a second predetermined time during said terminating mode interval.

3. The invention as set forth in claim 2 wherein said conditioner is heating or air conditioning and ventilating apparatus, said first mode being the heating or air conditioning mode of said apparatus and said second mode being the ventilating mode thereof, said initiating mode interval being in the morning and said terminating mode interval being in the afternoon, said second initiating and terminating means operating means having means for causing said first predetermined time to occur later during said initiating mode interval than said second predetermined time occurs during said terminating mode interval.

4. The invention as set forth in claim 1 wherein said initiating and terminating means comprises a switch, said displacement varying means of said operating means comprising a cam, a follower on said cam for actuating said switch, said member being an arm pivotable toward and away from said cam to move said switch toward and away from said cam for varying said displacement as a function of said environmental condition while said displacement is also varied as a function of time.

5. The invention as set forth in claim 4 wherein said operating means comprises in addition to said first named cam a second cam rotatable with said first cam, a second switch in addition to said first named switch, said second cam having a follower for actuating said second switch, a timer motor controlled by said second switch and said second cam for providing said initiating and terminating mode intervals, a clock motor and switch means operated by said clock motor and coupled to said second switch for initiating said initiating and terminating mode intervals at certain instants of time.

6. The invention as set forth in claim 5 further comprising a third switch, said second cam follower means also being disposed to actuate said third switch, said environmental conditioner having different operating modes one of which is initiated and terminated by said first switch and the other of which is initiated by said third switch and terminated by said clock switch means.

7. The invention as set forth in claim 6 wherein said first cam is a circular cam having generally the same radius and said second cam is a circular cam having two radii each over a separate 180 degree segment thereof, said first cam being eccentrically mounted and said second cam being concentrically mounted on the same shaft and rotatable therewith said shafts being the shaft of said timer motor.

8. The invention as set forth in claim 1 wherein said pneumatic mechanical control system comprises a pivotable arm which provides said member, a pneumatic actuator for pivoting said arm, a pneumatic relay for applying a control pressure to said actuation for operating said actuator in response to a pilot pressure signal which is applied thereto, and a feedback spring adjustably connected between said arm and said relay for varying the range of pilot pressures which provides a predetermined range of pivotable displacement of said arm.

9. A system for varying the starting times of environment conditioning apparatus in a plurality of different zones in accordance with existing environmental conditions which comprises optimal start timing means operative when enabled to provide an output after a period of time starting upon the enablement thereof which varies in accordance with an existing environmental condition, separate clock means provided for each of said zones said clock means each having a pair of switches, and means for programming said switches to close at selected times, means operated upon the closure of one of said pair of switches of any of said clock means for enabling said optimal start timing means, and means connecting the variable output from said optimal start timer means through the other of said pair of switches in said clock means for operating the environmental conditioning apparatus for the one of said zones for which is provided the ones of said clock means in which closure of said other switch occurs.

10. The invention as set forth in claim 9 wherein said optimal start timer has means which provides a second output a predetermined time after the enablement thereof, said conditioning apparatus has first and second modes of operation, and separate further switch means for each of said zones for enabling said second mode of operation therein, said variable output connecting means also connecting said variable output to said further switch means for selectively enabling said further switch means, said variable output being operable through said variable output connecting means to enable said first mode of operation selectively in different ones of said zones.

11. The invention as set forth in claim 9 wherein said optimal start timing means includes a timer motor, a cam rotatable by said timer motor, a switch, a cam follower coupling said switch to said cam, and pneumatic mechanical feedback means having an arm pivotably movable toward and away from said cam in accordance with said environmental condition, said switch being mounted on said arm for providing said variable start output, said means operable upon the closure of said one of said pair of switches of any of said clock means being connected to said timer motor for energizing said motor, said optimal start timer means having a second cam also rotatable by said timer motor, and switch means in said optimal start timer means actuated by said second cam and connected to said means operable upon closure of said one of any of said pairs of switches of any of said clock means for continuing the energization of said timer motor for a predetermined period of time after the energization of said timer motor.

* * * * *